US008553651B2

(12) United States Patent
Min

(10) Patent No.: US 8,553,651 B2
(45) Date of Patent: Oct. 8, 2013

(54) WIRELESS TERMINAL AND ROAMING METHOD USING THE SAME

(75) Inventor: Zhen-Fa Min, Shanghai (CN)

(73) Assignees: Ambit Microsystems (Shanghai) Ltd., Shanghai (CN); Hon Hai Precision Industry Co., Ltd., New Taipei (TW)

( * ) Notice: Subject to any disclaimer, the term of this patent is extended or adjusted under 35 U.S.C. 154(b) by 165 days.

(21) Appl. No.: 13/156,357

(22) Filed: Jun. 9, 2011

(65) Prior Publication Data

US 2012/0044911 A1 Feb. 23, 2012

(30) Foreign Application Priority Data

Aug. 18, 2010 (CN) .......................... 2010 1 0256445

(51) Int. Cl.
*H04W 4/00* (2009.01)
*H04W 36/00* (2009.01)
(52) U.S. Cl.
USPC ............ 370/333; 455/438; 455/440; 455/441
(58) Field of Classification Search
USPC ........................ 370/331–333; 455/436–444
See application file for complete search history.

(56) References Cited

U.S. PATENT DOCUMENTS

2009/0203380 A1* 8/2009 Park et al. ..................... 455/437
2010/0067488 A1 3/2010 Sashihara

FOREIGN PATENT DOCUMENTS

EP 1453343 A2 9/2004
EP 1599062 A2 11/2005

* cited by examiner

Primary Examiner — Ronald Abelson
(74) Attorney, Agent, or Firm — Altis Law Group, Inc.

(57) ABSTRACT

A wireless terminal roams from a first access point to a second access point. The wireless terminal can set a predetermined time period to determine whether to roam between different access points. Upon receiving signals from the second access point, the wireless terminal decodes signals received from the first access point and the second access point to get a correct probability of each bit of the signals. The wireless terminal then calculates mean values, a variance value and a difference in the mean values of the first access point and the second access point. If the difference in the mean value exceeds a product of the variance value and a roaming weight, the wireless terminal switches the wireless terminal from the first access point to the second access point to access the network.

8 Claims, 3 Drawing Sheets

WIRELESS TERMINAL AND ROAMING METHOD USING THE SAME

BACKGROUND

1. Technical Field

Embodiments of the present disclosure relate to wireless communications, and more particularly to a roaming method using a wireless terminal and the wireless terminal thereof.

2. Description of Related Art

In WIFI communications, a wireless terminal can access networks through access points (APs). The APs provide a number of points of connection for the wireless terminal. The wireless terminal may roam from one AP to another AP in the networks. In general, the wireless terminal determines whether to roam based on information of the Combined Communications-Quality & Load (CCQL). The information of CCQL is calculated by signal strength of the APs. However, the information signal strength may be not received from the APs in a zone full of other noise signals. What is needed, therefore, is a roaming method of the wireless terminal to overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module" as used herein, refers to logic embodied in hardware or firmware, or to a collection of software instructions, written in a programming language, such as, for example, Java, C, or Assembly. One or more software instructions in the module may be embedded in firmware, such as an EPROM. It will be appreciated that module may comprise connected logic units, such as gates and flip-flops, and may comprise programmable units, such as programmable gate arrays or processors. The module described herein may be implemented as either software and/or hardware module and may be stored in any type of computer-readable medium or other computer storage device.

Figure 1:
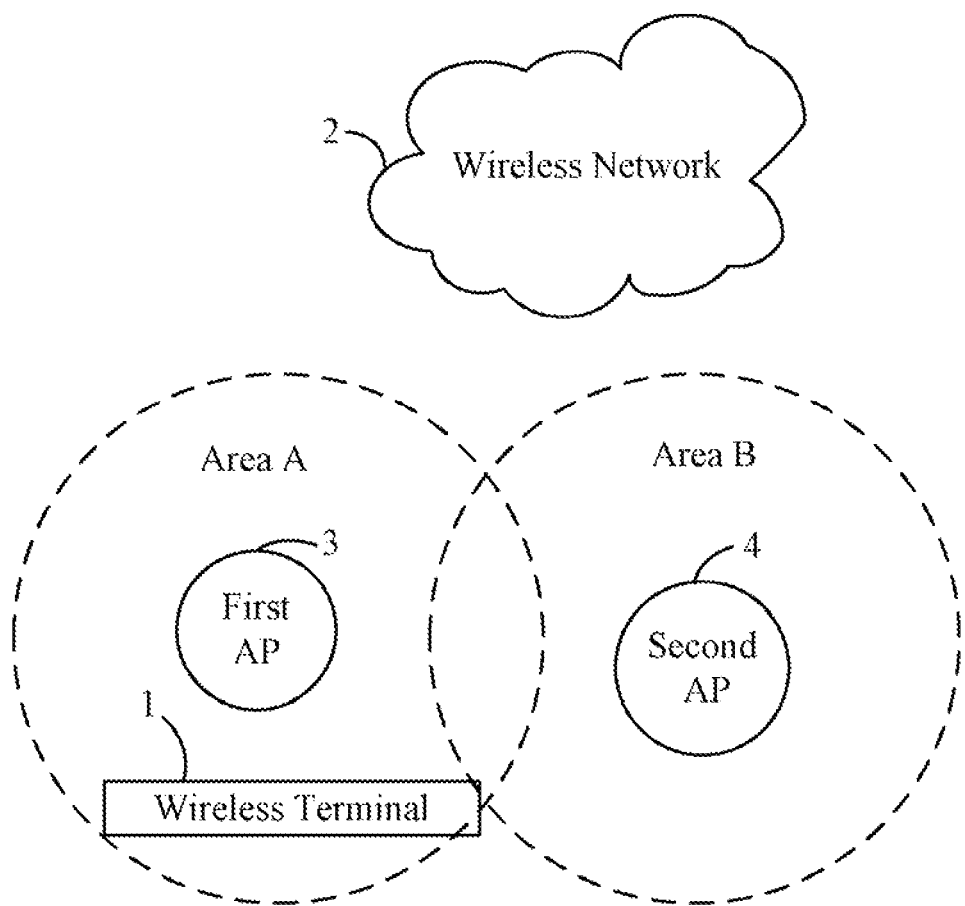
FIG. 1 is a schematic diagram illustrating an exemplary network using a wireless terminal.

FIG. 1 is a schematic diagram illustrating an exemplary network using a wireless terminal 1. The wireless terminal 1 begins to communicate with a wireless network 2 through a first access point 3. An area A is coverage of signals transmitted from the first access point 3. In addition, an area B is coverage of signals transmitted from a second access point 4. The area A is adjacent/next to the area B.

If the wireless terminal 1 moves from the area A to the area B, the wireless terminal 1 receives signals from the first access point 3 and the second access point 4. At the moment, the wireless terminal 1 accesses the wireless network 2 by roaming from the area A to the area B.

Figure 2:
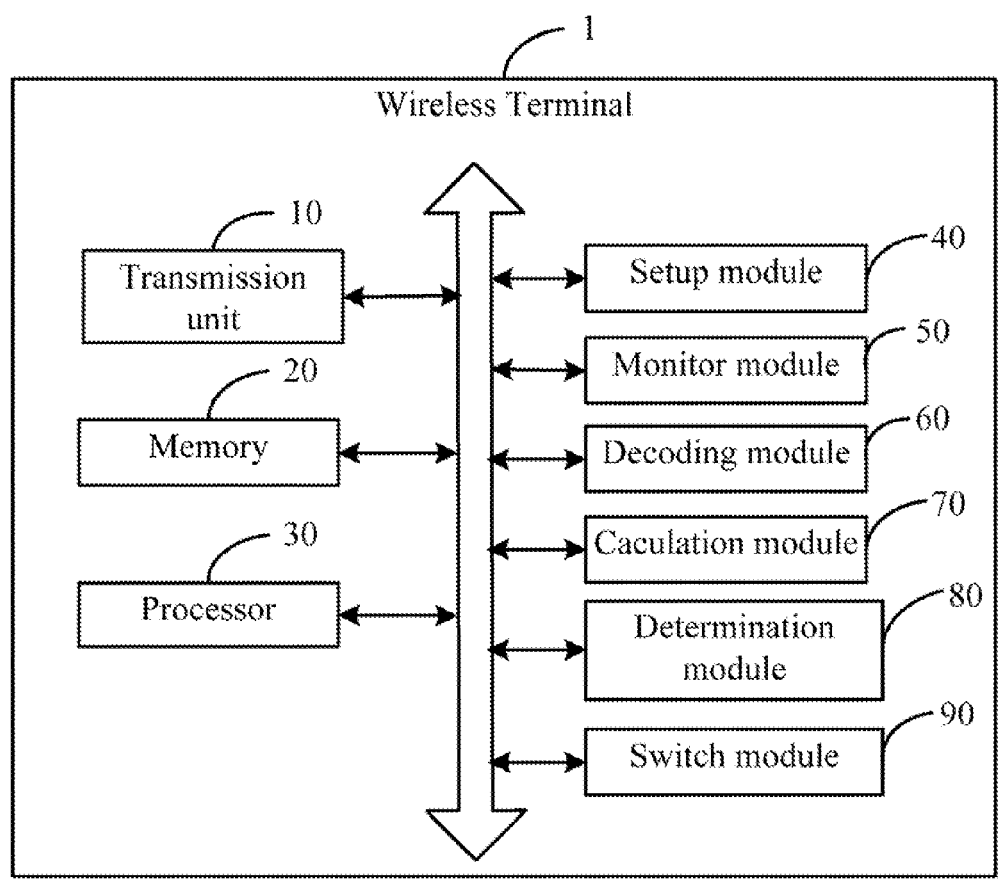
FIG. 2 is a block diagram of one embodiment of the wireless terminal of FIG. 1.

FIG. 2 is a block diagram of one embodiment of the wireless terminal 1. Depending on the embodiment, the wireless terminal 1 may be a mobile phone, a personal digital assistant (PDA), a handheld game console, a handheld computer, a tablet computer, or other device. The wireless terminal 1 includes a transmission unit 10, a memory 20, at least one processor 30, and one or more programs including a setup module 40, a monitor module 50, a decoding module 60, a calculation module 70, a determination module 80 and a switch module 90.

The wireless terminal 1 is generally controlled and coordinated by an operating system software, such as UNIX, LINUX, WINDOWS, MAC OS X, an embedded operating system, or any other compatible operating systems. In other embodiments, the wireless terminal 1 may be controlled by a proprietary operating system. Conventional operating systems control and schedule computer processes for execution, perform memory management, provide file system, networking, and I/O services, and provide a user interface, such as a graphical user interface (GUI), among other things.

The transmission unit 10 is operable to transmit and receive signals from the wireless terminal 1 and the wireless network 2 through connection with the first access point 3 and the second access point 4. In one embodiment, the first access point 3 and the second access point 4 may be the WIFI access points. The transmission unit 10 is a WIFI transmission module to transmit and receive signals between the wireless terminal 1 and the wireless network 2. In some embodiments, the wireless network 2 is the Internet or the Intranet.

The memory 20 is electronically connected to the transmission unit 10, the at least one processor 30, the setup module 40, the monitor module 50, the decoding module 60, the calculation module 70, the determination module 80 and the switch module 90. The memory 20 is operable to store many kinds of data, such as a customization function code of the wireless terminal 1, computerized codes, programs of an operating system and other applications of the wireless terminal 1. The memory 20 may include a hard disk drive, flash memory, RAM, ROM, cache, or external storage mediums.

The modules 40-90 may comprise computerized code in the form of one or more programs that are stored in the memory 20. The computerized code includes instructions that are executed by the at least one processor 30 to provide functions for modules 40-90. The at least one processor 30, as an example, may include a CPU, math coprocessor, shift register, for example.

The setup module 40 is operable to set a predetermined time period to calculate mean values of each bit of the signals received from the first access point 3 and the second access point 4, and a variance value of the each bit of the signals received from the second access point 4. For example, the setup module 40 set the predetermined time period as five seconds. In one embodiment, the mean values are calculated by the each bit of the signals received from the first access point 3 and the second access point 4 during five seconds. In other embodiments, the variance value is calculated by the each bit of the signals received from the second access point 4 during five seconds.

The monitor module 50 is operable to monitor a status of the transmission unit 10. In one embodiment, the monitor module 50 determines whether the signals transmitted from the transmission unit 10 are received from the second access point 4. For example, the monitor module 50 can monitor identifiers included in the signals transmitted from the transmission unit 10. The identifiers include information which the access point 3 or the second access point 4 transmits the signals. Accordingly, the monitor module 50 can determine whether the signals transmitted from the transmission unit 10 is from the second access point 4 by the identifier monitored.

The decoding module 60 is operable to decode the signals transmitted form the transmission unit 10 to get a correct probability of each bit of the signals. The correct probability of each bit of the signals is a bit ratio of a number of correct bits received and the total number of bits received. For example, the wireless terminal 1 receives signals include the total number of 10 bits and the correct bits received are 8 bits from the wireless network 2. The correct probability of each bit of the signals is 0.8.

In one embodiment, the transmission unit 10 transmits and receives signals from the wireless network 2 through connecting with the first access point 3 and the second access point 4. The decoding module 60 decodes the signals received from the first access point 3 and the second access point 4. Accordingly, the decoding module 60 gets the correct probability of each bit of the signals received from the first access point 3 and the second access point 4 and saves the correct probability of each bit of the signals in the memory 20.

The calculation module 70 is operable to calculate mean values of the each bit of the signals received from the first access point 3 and the second access point 4, a variance value of the each bit of the signals received from the second access point 4 during the predetermined time period. In addition, the calculation module 70 further calculates a difference in the mean values between the second access point 4 and the first access point 3. The calculated mean values, the variance value of the each bit of the signals, the difference in the mean values are then saved in the memory 20.

The predetermined time period is set as a later time period after detecting the signals received from the second access point 4. For example, if the predetermined time period is set as five seconds and the signals received from the second access point 4 is detected at 09:40:40 a.m., the calculation module 70 calculates the mean values and the variance value of the each bit of the signals during a time period between 09:40:40 a.m. and 09:40:45 a.m.

The determination module 80 is operable to determine whether a difference in the mean values of the second access point 4 and the first access point 3 exceeds a product of the variance value and a roaming weight of the first access point 3. Depending on different mean values, the difference in the mean values may be the mean value of the first access point 3 subtracted the second access point 4. The difference in the mean values also may be the mean value of the second access point 4 subtracted the first access point 3.

In one embodiment, if the wireless terminal 1 communicates with the wireless network 2 through the first access point 3 and detects the signals received from the second access point 4, the roaming weight of the first access point 3 is a constant, such as 0.25, for example. In other embodiments, the product of the variance value and the roaming weight of the first access point 3 indicate a roaming threshold of the first access point 3.

The switch module 90 is operable to switch the wireless terminal 1 from the first access point 3 to the second access point 4 to access the network 2. In one embodiment, if the difference in the mean values exceeds the product of the variance value and the roaming weight of the first access point 3, the switch module 90 switches the wireless terminal 1 from the first access point 3 to the second access point 4 to access the network 2.

Figure 3:
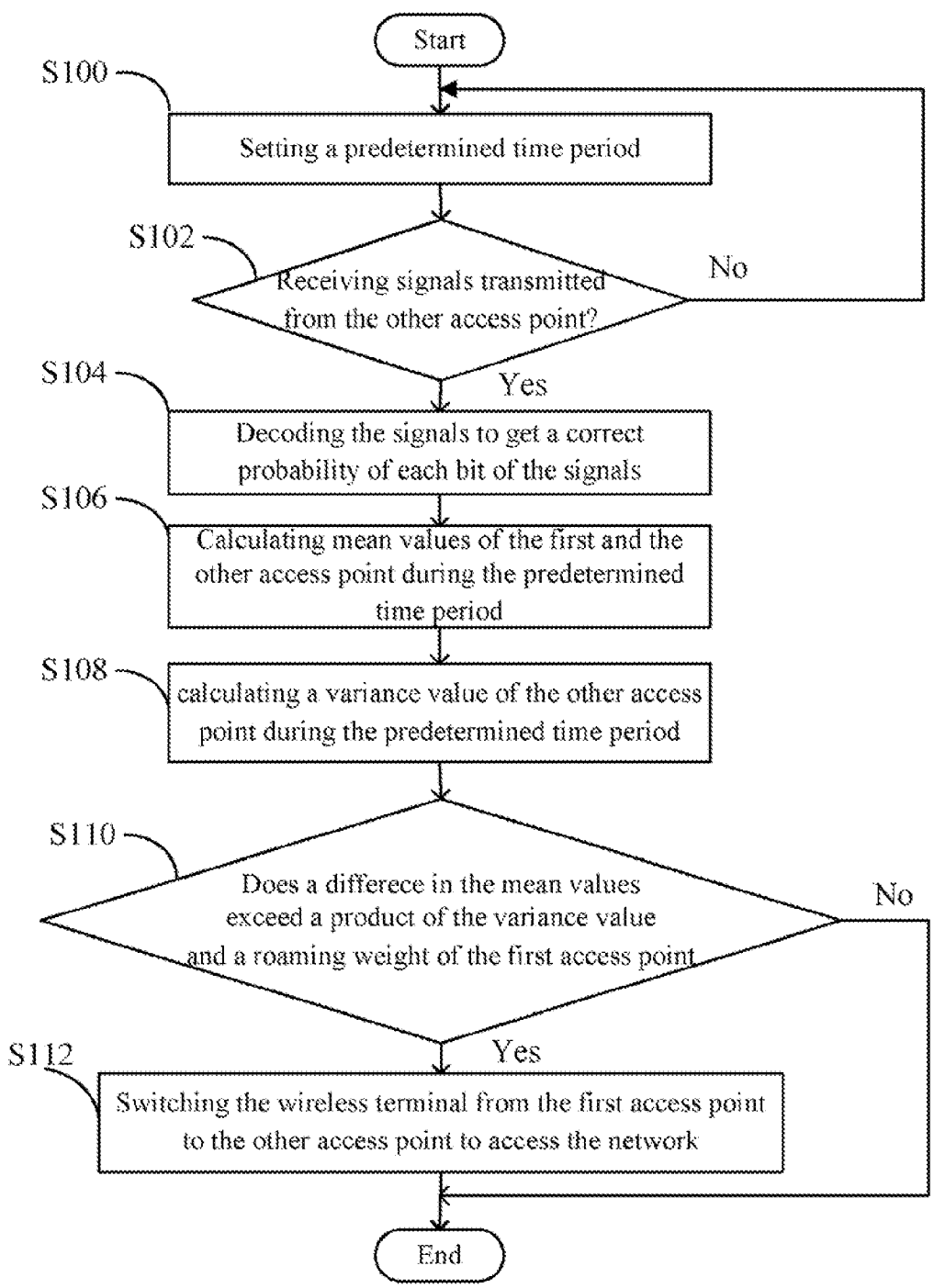
FIG. 3 is a flowchart of one embodiment of a roaming method using a wireless terminal.

FIG. 3 is a flowchart of one embodiment of a roaming method using a wireless terminal 1. Depending on the embodiment, additional blocks may be added, others deleted, and the ordering of the blocks may be changed.

In block S100, the setup module 40 sets a predetermined time period to calculate mean values of each bit of the signals received from the first access point 3 and an second access point 4, and a variance value of the each bit of the signals received from the second access point 4.

In block S102, the monitor module 50 determines whether the wireless terminal 1 receives signals from the second access point 4. If the wireless terminal 1 receives signals form the second access point 4, block S104 is implemented. If the wireless terminal 1 does not receive signals form the second access point 4, the process returns to block S100.

In block S104, the decoding module 60 decodes the signals received from the first access point 3 and the second access point 4 to get a correct probability of each bit of the signals received.

In block S106, the calculation module 70 calculates mean values of the each bit of the signals received from the first access point 3 and the second access point 4 during the predetermined time period.

In block S108, the calculation module 70 further calculates a variance value of the each bit of the signals received from the second access point 4 during the predetermined time period.

In block S110, the determination module 80 determines whether a difference in the mean values of the second access point 4 and the first access point 3 exceeds a product of the variance value and a roaming weight of the first access point 3. If the difference in the mean values exceeds the product of the variance value and the roaming weight, block S112 is implemented. If the difference in the mean values is less than the product of the variance value and the roaming weight, the process is ended.

Depending on different mean values, the difference in the mean values may be calculated by the mean value of the first access point 3 subtracted the second access point 4. The difference in the mean values also may be calculated by the mean value of the second access point 4 subtracted from the first access point 3.

In block S112, the switch module 90 switches the wireless terminal 1 from the first access point 3 to the second access point 4 to access the network 2.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A wireless terminal for accessing a network through a first access point and a second access point, comprising:
   a memory;
   at least one processor;
   a transmission unit operable to transmit and receive signals from the first access point and the second access point;
   one or more programs that are stored in the memory and are executed by the at least one processor, the one or more programs comprising:
   a monitor module operable to monitor a status of the transmission unit;
   a decoding module operable to decode the signals received from the first access point and the second access point to get a correct probability of each bit of the signals;
   a calculation module operable to calculate mean values of the each bit of the signals received from the first access point and the second access point, and calculate a variance value of the each bit of the signals received from the second access point;
   a determination module operable to determine whether a difference in the mean values of the second access point and the first access point exceeds a product of the variance value of the second access point and a roaming weight of the first access point, wherein the roaming weight of the first access point is a constant; and a switch module operable to switch the wireless terminal from the first access point to the second access point to access the network.

2. The wireless terminal of claim 1, the wireless terminal further comprises a setup module operable to set a predetermined time period for the calculation.

3. The wireless terminal of claim 1, wherein the monitor module further determines whether the signals transmitted from the second access point.

4. The wireless terminal of claim 1, wherein the first access point and the second access point are WIFI access points.

5. A method using a wireless terminal for roaming between a first access point and a second access point, the method comprising:

decoding signals received from the first access point and the second access point to get a correct probability of each bit of the signals upon detecting that receives signals received from the second access point;

calculating mean values of the each bit of the signals received from the first access point and the second access point, and calculating a variance value of the each bit of the signals received from the second access point;

determining whether a difference in the mean values of the second access point and the first access point exceeds a product of the variance value of the second access point and a roaming weight of the first access point, wherein the roaming weight of the first access point is a constant; and switching the wireless terminal from the first access point to the second access point to access the network if the a difference in the mean values exceeds the product of the variance value and the roaming weight.

6. The method of claim 5, further comprising setting a predetermined time period for the calculation step.

7. The method of claim 5, further comprising determining whether the signals received from the second access point.

8. The method of claim 5, wherein the first access point and the second access point are WIFI access points.

* * * * *